(12) United States Patent
Yoshida et al.

(10) Patent No.: US 9,234,267 B2
(45) Date of Patent: *Jan. 12, 2016

(54) HOT-DIP AL—ZN COATED STEEL SHEET

(75) Inventors: Masahiro Yoshida, Tokyo (JP); Hiroki Nakamaru, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 75 days.

This patent is subject to a terminal disclaimer.

(21) Appl. No.: 13/989,515

(22) PCT Filed: Nov. 25, 2011

(86) PCT No.: PCT/JP2011/077880
§ 371 (c)(1),
(2), (4) Date: May 24, 2013

(87) PCT Pub. No.: WO2012/070694
PCT Pub. Date: May 31, 2012

(65) Prior Publication Data
US 2013/0236739 A1 Sep. 12, 2013

(30) Foreign Application Priority Data
Nov. 26, 2010 (JP) .................. 2010-263212

(51) Int. Cl.
*C23C 2/02* (2006.01)
*C23C 2/06* (2006.01)
(Continued)

(52) U.S. Cl.
CPC ................. *C23C 2/02* (2013.01); *B32B 15/012* (2013.01); *C23C 2/06* (2013.01); *C23C 2/12* (2013.01);
(Continued)

(58) Field of Classification Search
CPC ...... B32B 15/012; B32B 15/04; B32B 15/18; B32B 15/20; C23C 2/02; C23C 2/06; C23C 2/12; C23C 8/14; C23C 28/345; C23C 28/321; C23C 28/3225; C23C 8/18; C23C 28/322; C23C 28/30; C23C 30/005; Y10T 428/12799; Y10T 428/12757; Y10T 428/12583; Y10T 428/1259; Y10T 428/12611; Y10T 428/12618; Y10T 428/1266; Y10T 428/12667; Y10T 428/12736; Y10T 428/1275; Y10T 428/12972; Y10T 428/12979; Y10T 428/27
USPC ......... 428/653, 650, 652, 632, 633, 628, 629, 428/630, 631, 639, 640, 658, 659, 684, 685
See application file for complete search history.

(56) References Cited

U.S. PATENT DOCUMENTS

2009/0053555 A1 2/2009 Nose
2010/0065160 A1 3/2010 Meurer et al.
(Continued)

FOREIGN PATENT DOCUMENTS

CA 2749695 7/2010
JP 46-7161 3/1971
(Continued)

OTHER PUBLICATIONS

Machine Translation, Honda et al., JP 2006-283155, Oct. 2006.*
(Continued)

*Primary Examiner* — Michael E La Villa
(74) *Attorney, Agent, or Firm* — RatnerPrestia

(57) ABSTRACT

There is provided a hot-dip Al—Zn coated steel sheet that has a steel sheet containing Si and Mn as a base steel sheet and has excellent coating appearance and corrosion resistance. The Al—Zn coating layer has an Al content in the range of 20% to 95% by mass. The Al—Zn coating layer has a Ca content in the range of 0.01% to 10% by mass. Alternatively, the Ca and Mg content is in the range of 0.01% to 10% by mass. A steel sheet surface layer within 100 μm from a surface of the base steel sheet directly under the Al—Zn coating layer contains less than 0.060 g/m² per surface of an oxide of at least one selected from Fe, Si, Mn, Al, P, B, Nb, Ti, Cr, Mo, Cu, and Ni in total.

4 Claims, 2 Drawing Sheets

LARGE SHEET (150 mm x 70 mm): GALVANNEALED STEEL SHEET
SMALL SHEET (110 mm x 40 mm): STEEL SHEET TO BE TESTED

(51) Int. Cl.
*C23C 2/12* (2006.01)
*B32B 15/01* (2006.01)

(52) U.S. Cl.
CPC ...... *Y10T 428/1259* (2015.01); *Y10T 428/1266* (2015.01); *Y10T 428/1275* (2015.01); *Y10T 428/12583* (2015.01); *Y10T 428/12611* (2015.01); *Y10T 428/12618* (2015.01); *Y10T 428/12667* (2015.01); *Y10T 428/12736* (2015.01); *Y10T 428/12757* (2015.01); *Y10T 428/12799* (2015.01); *Y10T 428/12972* (2015.01); *Y10T 428/12979* (2015.01); *Y10T 428/27* (2015.01)

(56) References Cited

U.S. PATENT DOCUMENTS

| | | |
|---|---|---|
| 2011/0217569 A1 | 9/2011 | Fushiwaki |
| 2013/0236739 A1 | 9/2013 | Yoshida |

FOREIGN PATENT DOCUMENTS

| | | |
|---|---|---|
| JP | 51-149832 A | 12/1976 |
| JP | 55122865 | 9/1980 |
| JP | 4-009456 A | 1/1992 |
| JP | 7-216524 A | 8/1995 |
| JP | 10-053893 A | 2/1998 |
| JP | 10158784 | 6/1998 |
| JP | 2001-192795 A | 7/2001 |
| JP | 2001-316791 A | 11/2001 |
| JP | 2002-129300 A | 5/2002 |
| JP | 2005-272967 A | 10/2005 |
| JP | 2006-283155 A | 10/2006 |
| JP | 2008-045203 A | 2/2008 |
| JP | 2009293118 | 12/2009 |
| JP | 2010-501725 A | 2/2010 |
| JP | 2010255106 | 11/2010 |
| JP | 2010255110 | 11/2010 |
| WO | 2010061957 | 6/2010 |

OTHER PUBLICATIONS

International Search Report dated Feb. 21, 2012, Application No. PCT/JP2011/077880.
International Search Report dated Feb. 21, 2012 in PCT/JP2011/077882.
Entire patent prosecution history of U.S. Appl. No. 13/989,287, filed May 23, 2013, entitled, "Hot-Dip Al—Zn Coated Steel Sheet."
European Search Report mailed Nov. 18, 2015 in European Application No. 11843998.3.

* cited by examiner

HOT-DIP AL—ZN COATED STEEL SHEET

CROSS REFERENCE TO RELATED APPLICATIONS

This application is the U.S. National Phase application of PCT/JP2011/077880, filed Nov. 25, 2011, and claims priority to Japanese Patent Application No. 2010-263212, filed Nov. 26, 2010, the disclosures of each of these applications being incorporated herein by reference in their entireties for all purposes.

FIELD OF THE INVENTION

The present invention relates to a hot-dip Al—Zn coated steel sheet that has a steel sheet containing Si and Mn as a base steel sheet and has excellent coating appearance and corrosion resistance and a method for manufacturing the hot-dip Al—Zn coated steel sheet and, more particularly, to a hot-dip Al—Zn coated steel sheet having excellent coating appearance and joint corrosion resistance and a method for manufacturing the hot-dip Al—Zn coated steel sheet.

BACKGROUND OF THE INVENTION

Hot-dip Al—Zn coated steel sheets that contain 20% to 95% by mass of Al in the coating layer have higher corrosion resistance than hot-dip galvanized steel sheets, as described in Patent Literature 1.

In general, hot-dip Al—Zn coated steel sheets are manufactured by recrystallization annealing and hot-dip coating treatment of a base steel sheet in an annealing furnace on a continuous hot-dip line. The base steel sheet is a thin steel sheet manufactured by hot rolling or cold rolling of a slab. The Al—Zn coating layer includes an alloy phase at an interface between the Al—Zn coating layer and the base steel sheet and an upper layer disposed on the alloy phase. The upper layer includes one portion that mainly contains supersaturated Zn and in which Al is dendritically solidified and another portion between the dendrites. The dendritic solidification portion has a layered structure in the thickness direction of the coating layer. Such a characteristic layer structure makes a corrosion evolutionary path from the surface more complex and makes it difficult for corrosion to reach the base steel sheet. Thus, hot-dip Al—Zn coated steel sheets have higher corrosion resistance than hot-dip galvanized steel sheets that include a coating layer having the same thickness.

There is a growing demand for such corrosion-resistant hot-dip Al—Zn coated steel sheets particularly in the field of construction materials, such as those for roofs and walls, which are exposed to the outdoors for a long period of time, and such steel sheets have also recently been used in the automotive field. However, use of hot-dip Al—Zn coated steel sheets in the automotive field has the following problems.

In the automotive field, it is required to improve mileage by reducing the weight of automobile bodies to decrease $CO_2$ emissions as part of measures against global warming. Thus, there is a strong demand for weight reduction by the use of high-strength steel sheets and gauge reduction by improving the corrosion resistance of steel sheets. However, hot-dip Al—Zn coating treatment of a high-strength steel sheet that contains a large amount of an oxidizable solid-solution strengthening element, such as Si or Mn, results in the formation of an uncoated portion, that is, poor coatability, which results in poor coating appearance. This results from the fact that the reducing atmosphere for reducing Fe in an annealing furnace becomes an oxidizing atmosphere for an oxidizable solid-solution strengthening element, such as Si or Mn, in a steel sheet. More specifically, an oxidizable element Si or Mn undergoes selective surface oxidation (hereinafter referred to as surface enrichment) on the surface of a steel sheet in an annealing process, thereby markedly lowering the wettability of the steel sheet to molten metal.

Patent Literature 2 discloses a technique for improving wettability by adjusting the dew point in a reduction furnace to $-10°$ C. or less. However, this technique cannot reduce the formation of internal oxide.

In general, when used in the automotive field, hot-dip coated steel sheets are supplied to automobile manufacturers after coating with continuous hot-dip coating equipment. The hot-dip coated steel sheets are processed and joined into the shapes of automotive body components and are then subjected to chemical conversion treatment and electrodeposition coating. Thus, when used in the automotive field, the joined portions inevitably include a joint at which steel sheets overlap each other. The joint cannot be easily subjected to chemical conversion treatment or electrodeposition coating and therefore has lower perforation corrosion resistance than portions appropriately subjected to chemical conversion treatment and electrodeposition coating. Thus, there is a problem that the joint has low corrosion resistance.

PATENT LITERATURE

PTL 1: Japanese Examined Patent Application Publication No. 46-7161

PTL 2: Japanese Unexamined Patent Application Publication No. 2005-272967

SUMMARY OF THE INVENTION

In view of the situations described above, the present invention provides a hot-dip Al—Zn coated steel sheet that has a steel sheet containing Si and Mn as a base steel sheet and has excellent coating appearance and corrosion resistance and a method for manufacturing the hot-dip Al—Zn coated steel sheet.

As a result of extensive studies to solve the problems of coatability described above, the present inventors obtained the following findings.

In a heating step before coating treatment, for example, while a temperature region having an annealing furnace internal temperature of 650° C. or more and A° C. or less (A: 700≤A≤900) is controlled to have a dew point of $-40°$ C. or less, a steel sheet to be coated is subjected to annealing and hot-dip coating treatment. A temperature region having an annealing furnace internal temperature of 650° C. or more and A° C. or less (A: 700≤A≤900) is controlled to have a dew point of $-40°$ C. or less in the atmosphere to lower oxygen potential at interface between the steel sheet and the atmosphere, thereby decreasing an oxide of at least one selected from Fe, Si, Mn, Al, P, B, Nb, Ti, Cr, Mo, Cu, and Ni to less than $0.060\ g/m^2$ per surface in a steel sheet surface layer within 100 μm from a surface of the base steel sheet directly under the Al—Zn coating layer. At the same time, the crystal grain size is increased to reduce surface enrichment in a temperature region of more than A° C. This improves coatability and allows a hot-dip Al—Zn coated steel sheet having an excellent coating appearance to be manufactured. In the heating step before coating treatment, the annealing furnace residence time in a temperature region in which the steel sheet temperature of a steel sheet to be coated is 600° C. or more can be controlled to 200 seconds or less to minimize oxidation of an oxidizable element.

As a result of extensive studies to solve the problems of corrosion resistance, the present inventors found that the inclusion of Ca or Ca and Mg in an Al—Zn coating layer could achieve unprecedentedly excellent corrosion resistance. More specifically, the coating layer contains 0.01% to 10% by mass of Ca or Ca and Mg. The inclusion of 0.01% to 10% by mass of Ca or Ca and Mg allows these elements to be contained in a corrosion product formed on a joint. This can stabilize the corrosion product, retard the development of corrosion, and provide excellent perforation corrosion resistance. When the ratio Ca/Zn of the Ca content to the Zn content in the Al—Zn coating layer is 0.50 or less and when the coating layer contains more than 2.00% by mass and 10% by mass or less of Ca or Ca and Mg, a hard intermetallic compound that contains Ca or Mg in a Zn phase is formed, thus achieving excellent scratch resistance.

The present invention is based on these findings and has the following characteristics according to an exemplary embodiment.

[1] A hot-dip Al—Zn coated steel sheet that includes an Al—Zn coating layer having an Al content in the range of 20% to 95% by mass on a surface of the steel sheet, wherein the Al—Zn coating layer contains 0.01% to 10% by mass of Ca, and a steel sheet surface layer within 100 μm from a surface of a base steel sheet directly under the Al—Zn coating layer contains less than 0.060 g/m² per surface of an oxide of at least one selected from Fe, Si, Mn, Al, P, B, Nb, Ti, Cr, Mo, Cu, and Ni in total.

[2] A hot-dip Al—Zn coated steel sheet that includes an Al—Zn coating layer having an Al content in the range of 20% to 95% by mass on a surface of the steel sheet, wherein the Al—Zn coating layer contains 0.01% to 10% by mass of Ca and Mg in total, and a steel sheet surface layer within 100 μm from a surface of a base steel sheet directly under the Al—Zn coating layer contains less than 0.060 g/m² per surface of an oxide of at least one selected from Fe, Si, Mn, Al, P, B, Nb, Ti, Cr, Mo, Cu, and Ni in total.

[3] The hot-dip Al—Zn coated steel sheet according to [1] or [2], wherein the ratio Ca/Zn of the Ca content to the Zn content in the Al—Zn coating layer is 0.50 or less.

[4] The hot-dip Al—Zn coated steel sheet according to any one of [1] to [3], wherein the Al—Zn coating layer contains more than 2.00% by mass and 10% by mass or less of Ca or Ca and Mg in total.

[5] A method for manufacturing a hot-dip Al—Zn coated steel sheet that involves heating a steel sheet and subsequently subjecting the steel sheet to hot-dip Al—Zn coating treatment, wherein in the heating step a temperature region having an annealing furnace internal temperature of 650° C. or more and A° C. or less (A: 700≤A≤900) is controlled to have a dew point of −40° C. or less in the atmosphere, and the hot-dip Al—Zn coating treatment involves use of a hot-dip Al—Zn coating bath that contains 20% to 95% by mass of Al and 0.01% to 10% by mass of Ca or Ca and Mg in total.

[6] The method for manufacturing a hot-dip Al—Zn coated steel sheet according to [5], wherein the annealing furnace residence time in a temperature region having a steel sheet temperature of 600° C. or more in the heating step is 200 seconds or less.

[7] The method for manufacturing a hot-dip Al—Zn coated steel sheet according to [5] or [6], wherein the hot-dip Al—Zn coating treatment involves use of a hot-dip Al—Zn coating bath in which the ratio Ca/Zn of the Ca content to the Zn content is 0.50 or less.

[8] The method for manufacturing a hot-dip Al—Zn coated steel sheet according to any one of [5] to [7], wherein the hot-dip Al—Zn coating treatment involves use of a hot-dip Al—Zn coating bath that contains more than 2.00% by mass and 10% by mass or less of Ca or Ca and Mg in total.

A hot-dip Al—Zn coated steel sheet according to the present invention is preferably applied to a high-strength steel sheet having a tensile strength TS of 340 MPa or more. Whether subjected to alloying treatment or not, a steel sheet coated with Al—Zn by a coating treatment method is herein collectively referred to as a hot-dip Al—Zn coated steel sheet. Thus, a hot-dip Al—Zn coated steel sheet in the present invention includes both a hot-dip Al—Zn coated steel sheet that is not subjected to alloying treatment and a hot-dip Al—Zn coated steel sheet that is subjected to alloying treatment.

The present invention can provide a hot-dip Al—Zn coated steel sheet that has excellent coating appearance and corrosion resistance, particularly joint corrosion resistance. The application of a hot-dip Al—Zn coated steel sheet according to the present invention to a high-strength steel sheet can achieve both weight reduction and excellent corrosion resistance in the automotive field.

DETAILED DESCRIPTION OF EMBODIMENTS OF THE INVENTION

Figure 1:
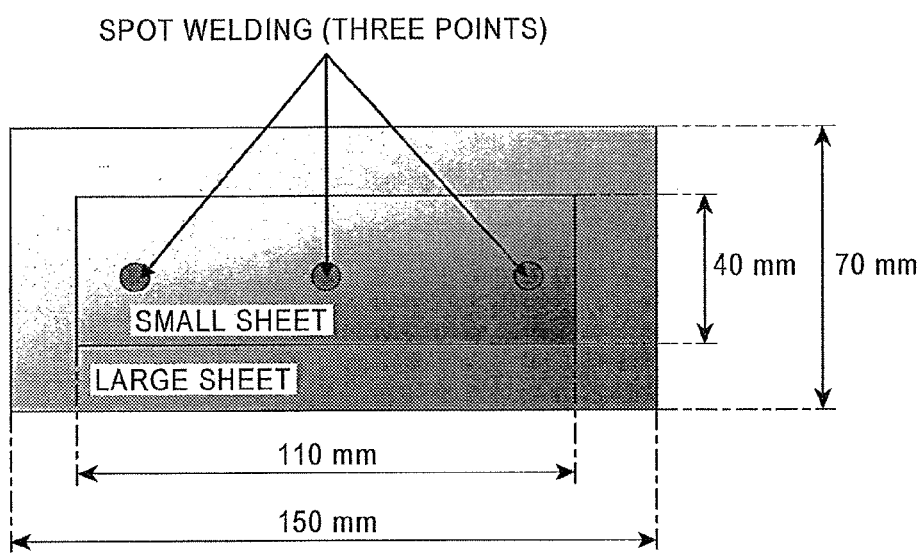
FIG. 1 is a schematic view of a joined material test specimen. (Example 1)

The present invention will be further described below.

First, the structure of the surface of the base steel sheet directly under the Al—Zn coating layer, which is the most important requirement in the present invention, will be described below.

In a hot-dip Al—Zn coated steel sheet according to an embodiment of the present invention, a steel sheet surface layer within 100 μm from the surface of the base steel sheet directly under the Al—Zn coating layer contains less than 0.060 g/m² per surface of an oxide of at least one selected from Fe, Si, Mn, Al, P, B, Nb, Ti, Cr, Mo, Cu, and Ni in total.

In order to achieve satisfactory coatability in a hot-dip Al—Zn coated steel sheet in which Si and a large amount of Mn are added into the steel, it is necessary to reduce the surface enrichment of an oxidizable element, such as Si or Mn, that causes deterioration in coatability and coating adhesion in an annealing process. In order to achieve satisfactory corrosion resistance and peel resistance of coating in advanced processing, it is required to minimize the internal oxidation of the surface layer of the base steel sheet directly under the coating layer, which may be the starting point of corrosion or cracking in advanced processing.

In an embodiment of the present invention, in order to ensure coatability, a temperature region having an annealing furnace internal temperature of 650° C. or more and A° C. or less (A: 700≤A≤900) in the heating step is controlled to have a dew point of −40° C. or less in the atmosphere to lower oxygen potential, thereby decreasing activity of an oxidizable element, such as Si or Mn, in the surface layer of the base steel sheet. This reduces the surface enrichment of these elements and increases the crystal grain size by recrystallization. In other words, while the surface enrichment of an element, such as Si or Mn, is reduced, the number of grain boundaries, which act as diffusion paths for these elements, is decreased. This reduces selective surface diffusion in a temperature region of more than A° C. and consequently improves coatability. This also reduces internal oxidation in the surface layer of the base steel sheet and improves corrosion resistance and processability. Furthermore, in the heating step, the annealing furnace residence time at a steel sheet temperature of 600° C. or more can be controlled to 200 seconds or less to minimize the oxidation reaction of an oxidizable element.

These effects can be observed by controlling the amount of internal oxide of at least one selected from Fe, Si, Mn, Al, P, B, Nb, Ti, Cr, Mo, Cu, and Ni to less than 0.060 g/m² in total in the steel sheet surface layer within 100 µm from the surface of the base steel sheet. When the total amount of oxide formed (hereinafter referred to as the amount of internal oxidation) is 0.060 g/m² or more, corrosion resistance and processability deteriorate. Even when the amount of internal oxidation is reduced to less than 0.0001 g/m², the effects of improving corrosion resistance and processability are saturated. Thus, the lower limit of the amount of internal oxidation is preferably 0.0001 g/m².

As a method for preventing the formation of an internal oxide of an oxidizable element, such as Si or Mn, within 100 µm from the surface of the base steel sheet to reduce the surface enrichment of these elements in an embodiment of the present invention, in order to minimize a possible oxidation reaction of an oxidizable element, for example, reduction annealing in the heating step is performed while the atmosphere is controlled to have decreased oxygen potential (a dew point in the atmosphere: −40° C. or less) and the annealing furnace residence time is preferably controlled in a region having a high steel sheet temperature.

More specifically, a temperature region having an annealing furnace internal temperature of 650° C. or more and A° C. or less (A: 700≤A≤900) is controlled to have a dew point of −40° C. or less in the atmosphere, the oxygen potential at an interface between the steel sheet and the atmosphere is decreased, and the surface enrichment of an element, such as Si or Mn, is decreased without forming an internal oxide. At the same time, the crystal grain size is increased to reduce surface enrichment in a temperature region of more than A° C. These eliminate the formation of an uncoated portion and achieve higher corrosion resistance and high peel resistance of coating in advanced processing. After subsequent coating treatment, the resulting hot-dip Al—Zn coated steel sheet contains less than 0.060 g/m² per surface of an oxide of at least one selected from Fe, Si, Mn, Al, P, B, Nb, Ti, Cr, Mo, Cu, and Ni on a surface of the steel sheet within 100 µm from the surface of the base steel sheet directly under the coating layer.

The reason that the temperature region in which the dew point is controlled is 650° C. or more is described below. In a temperature region of less than 650° C., there is no surface enrichment or internal oxidation that can cause a problem with respect to the formation of an uncoated portion, deterioration in corrosion resistance, or deterioration in peel resistance of coating. Thus, a temperature region that has the advantages of the present invention is 650° C. or more.

The reason that the temperature region is A° C. or less (A: 700≤A≤900) is described below. In a temperature region of more than A° C., recrystallization increases the crystal grain size. This decreases the number of grain boundaries, which act as selective surface diffusion paths for the element, such as Si or Mn, and reduces surface enrichment, obviating the necessity of controlling the dew point to reduce surface enrichment. Thus, the upper limit temperature A is a temperature at which recrystallization increases the crystal grain size. In general, since the recrystallization temperature depends on the type and the mass percent of a component element contained, A may be in the range of 700≤A≤900.

The reason that the lower limit is 700° C. is that no recrystallization occurs below 700° C. Furthermore, excellent mechanical characteristics with a good balance between tensile strength and elongation can be achieved at 700° C. or more. On the other hand, the reason that the upper limit is 900° C. is that the effects are saturated above 900° C.

The reason that the dew point is −40° C. or less is described below. The effect of reducing surface enrichment begins to be observed at a dew point of −40° C. Although the lower limit of the dew point is not particularly limited, a dew point of −80° C. or less has saturated effects and is disadvantageous in terms of cost. Thus, −80° C. or more is desirable.

The atmosphere and temperature of the heating step are appropriately controlled to reduce the surface enrichment of an oxidizable element, such as Si or Mn, without the internal oxidation of the oxidizable element, thereby providing a hot-dip Al—Zn coated steel sheet that has excellent coating appearance. The term "excellent coating appearance" refers to an appearance having no uncoated portion.

The annealing furnace residence time in a temperature region having a steel sheet temperature of 600° C. or more in the heating step is preferably 200 seconds or less. At a steel sheet temperature of less than 600° C., there is no surface enrichment or internal oxidation that can cause a problem with respect to the formation of an uncoated portion, deterioration in corrosion resistance, or deterioration in peel resistance of coating. On the other hand, at a steel sheet temperature of 600° C. or more, the amounts of surface enrichment product and internal oxide increase with the residence time. Thus, the annealing furnace residence time at a steel sheet temperature of 600° C. or more is controlled.

At a residence time of 200 seconds or less, surface enrichment and internal oxidation can be small enough to ensure coatability, corrosion resistance, and peel resistance of coating. On the other hand, at 40 seconds or more, the dipped sheet temperature in a coating bath does not decrease, reactivity with the coating bath is not decreased, a natural oxidation film mainly composed of Fe oxide on a surface of the steel sheet is sufficiently reduced, and there is no uncoated portion. Furthermore, excellent mechanical characteristics with a good balance between tensile strength and elongation can be achieved, and dross is not formed. Thus, the annealing furnace residence time in a temperature region having a steel sheet temperature of 600° C. or more is more preferably 40 seconds or more and 200 seconds or less. The effects of reducing surface enrichment and internal oxidation are increased with decreasing annealing furnace residence time. Thus, the annealing furnace residence time is preferably controlled to be close to 40 seconds or more.

Thus, the annealing furnace residence time in the heating step can be appropriately controlled to enhance the effect of reducing the surface enrichment of an oxidizable element, such as Si or Mn, without the internal oxidation of the oxidizable element, thereby providing a hot-dip Al—Zn coated steel sheet that has further excellent coating appearance.

The amount of internal oxide in the present invention refers to the amount of internal oxidation (0 oxygen equivalent amount) and can be measured by an "impulse furnace fusion-infrared absorption method". The amount of internal oxidation within 100 µm of a steel sheet surface layer is calculated by subtracting the oxygen content of a material (steel sheet) from the total amount of oxidation in the thickness direction of the steel sheet. In the present invention, therefore, the oxygen concentration of steel is measured after polishing of 100 µm of the surface layers on both faces of the steel sheet after the heating step. The measured value is assumed to be the oxygen content $O_H$ of the material. The total oxygen concentration of steel in the thickness direction of the steel sheet after the heating step is measured. The measured value is assumed to be the oxygen content $O_I$ after internal oxidation. The oxygen content $O_I$ after internal oxidation of the steel sheet and the oxygen content $O_H$ of the material are used to calculate a difference between $O_I$ and $O_H$ (=$O_I$−$O_H$). The difference is converted into a value per surface unit area (that is, 1 m$^2$) (g/m$^2$), which is assumed to be the amount of internal oxidation. The preparation of a calibration curve in advance allows the quantification of O with fluorescent X-rays in a simplified manner. Any other method that can determine the amount of internal oxidation may be used.

A steel composition suitable for a hot-dip Al—Zn coated steel sheet according to the present invention will be described below. Although not particularly limited, in order to ensure stable manufacturing and satisfactory processability of manufactured coated steel sheets in automotive applications, the following steel compositions are preferred. In the following description, the unit of each element content of the steel composition is "% by mass", which is simply expressed by "%" unless otherwise specified.

C, 0.01% to 0.18%

C improves processability by forming martensite as a steel structure. To this end, 0.01% or more is preferred. However, more than 0.18% may cause deterioration in weldability. Thus, the C content is preferably 0.01% or more and 0.18% or less.

Si: 0.001% to 2.0%

Si is an element that is effective in strengthening steel and achieving good material processability. 0.001% or more is preferred to achieve both high strength and processability. Less than 0.001% of Si sometimes cannot achieve high strength. On the other hand, more than 2.0% may make it difficult to improve the peel resistance of coating in advanced processing. Thus, the Si content is preferably 0.001% or more and 2.0% or less.

Mn: 0.1% to 3.0%

Mn is an element that is effective in strengthening steel. In order to ensure excellent mechanical characteristics and strength, the content of 0.1% or more is preferred. However, more than 3.0% may make it difficult to ensure weldability, coating adhesion, and a balance between strength and ductility. Thus, the Mn content is preferably 0.1% or more and 3.0% or less.

Al: 0.001% to 1.0%

Al is added for the purpose of deoxidation of molten steel. The Al content of less than 0.001% rarely achieves this purpose. 0.001% or more ensures the effect of deoxidation of molten steel. However, more than 1.0% may increase costs. Thus, the Al content is preferably 0.001% or more and 1.0% or less.

P: 0.005% to 0.060% or less

P is one of incidental impurities. Reduction to less than 0.005% may increase costs. Thus, 0.005% or more is preferred. However, more than 0.060% of P may cause deterioration in weldability, surface quality, or coating adhesion. The P content is preferably 0.005% or more and 0.060% or less.

S≤0.01%

S is one of incidental impurities. Although the lower limit is not particularly limited, a high S content may cause deterioration in weldability. Thus, 0.01% or less is preferred.

In order to control the balance between strength and ductility, one or more elements selected from B: 0.001% to 0.005%, Nb: 0.005% to 0.05%, Ti: 0.005% to 0.05%, Cr: 0.001% to 1.0%, Mo: 0.05% to 1.0%, Cu: 0.05% to 1.0%, and Ni: 0.05% to 1.0% may be added if necessary. The reasons for limiting the appropriate amounts of these elements to be added are described below.

B: 0.001% to 0.005%

Less than 0.001% of B rarely achieves a quenching promoting effect. On the other hand, more than 0.005% causes deterioration in coating adhesion. Thus, if present, the B content is 0.001% or more and 0.005% or less.

Nb: 0.005% to 0.05%

Less than 0.005% of Nb has little effect of strength adjustment. Less than 0.005% of Nb in combination with Mo has little effect of improving coating adhesion. On the other hand, more than 0.05% results in an increase in cost. Thus, if present, the Nb content is 0.005% or more and 0.05% or less.

Ti: 0.005% to 0.05%

Less than 0.005% of Ti has little effect of strength adjustment. On the other hand, more than 0.05% causes deterioration in coating adhesion. Thus, if present, the Ti content is 0.005% or more and 0.05% or less.

Cr: 0.001% to 1.0%

Less than 0.001% of Cr rarely achieves a quenching effect. On the other hand, more than 1.0% of Cr undergoes surface enrichment, causing deterioration in coating adhesion or weldability. Thus, if present, the Cr content is 0.001% or more and 1.0% or less.

Mo: 0.05% to 1.0%

Less than 0.05% of Mo has little effect of strength adjustment. Less than 0.05% of Mo in combination with Nb, Ni, or Cu has little effect of improving coating adhesion. On the other hand, more than 1.0% results in an increase in cost. Thus, if present, the Mo content is 0.05% or more and 1.0% or less.

Cu: 0.05% to 1.0%

Less than 0.05% of Cu has little effect of promoting the formation of a residual γ phase. Less than 0.05% of Cu in combination with Ni or Mo has little effect of improving coating adhesion. On the other hand, more than 1.0% results in an increase in cost. Thus, if present, the Cu content is 0.05% or more and 1.0% or less.

Ni: 0.05% to 1.0%

Less than 0.05% of Ni has little effect of promoting the formation of a residual γ phase. Less than 0.05% of Ni in combination with Cu or Mo has little effect of improving coating adhesion. On the other hand, more than 1.0% results in an increase in cost. Thus, if present, the Ni content is 0.05% or more and 1.0% or less.

The remainder are Fe and incidental impurities.

The coating layer composition and the coating layer structure of a hot-dip Al—Zn coated steel sheet according to the present invention will be described below. The unit of each element content of the coating layer composition is "% by mass", which is simply expressed by "%" unless otherwise specified.

Al: 20% to 95%

A coated steel sheet according to an embodiment of the present invention is a hot-dip Al—Zn coated steel sheet that contains 20% to 95% of Al in the coating layer. 20% or more of Al results in the dendritic solidification of Al in an upper layer of the coating layer, which includes two layers: an alloy phase at an interface between the coating layer and the base steel sheet and the upper layer disposed on the alloy phase. The upper layer includes one portion that mainly contains supersaturated Zn and in which Al is dendritically solidified and another portion between the dendrites. The dendritic solidification portion has a layered structure in the thickness direction of the coating layer and has a structure having excellent corrosion resistance and processability. For this reason, the lower limit of Al is 20%. In order to consistently form such a coating layer structure, Al is preferably 45% or more. However, more than 95% of Al results in a decreased amount of Zn, which has a sacrificial protection effect on Fe, causing deterioration in corrosion resistance when the steel base material is exposed. Thus, the upper limit of Al is 95%. In general, a smaller amount of coating adhered results in a larger area of steel base material exposed. In order to achieve sufficient corrosion resistance even with a small amount of adhered coating, Al is preferably 85% or less. In Al—Zn hot-dip coating, an increase in Al content results in an increase in coating bath temperature (hereinafter referred to as bath temperature), possibly causing an operational problem. However, the Al content described above results in a moderate bath temperature and causes no problem. For this reason, the Al content of the coating layer is limited to the range of 20% to 95% and is preferably in the range of 45% to 85% in terms of the balance between performance (corrosion resistance, processability, or the like) and operation.

Ca: 0.01% to 10% or Ca+Mg: 0.01% to 10%

In the present invention, the coating layer preferably contains 0.01% to 10% of Ca. Alternatively, the coating layer contains 0.01% to 10% of Ca and Mg in total. The inclusion of Ca or Ca and Mg in the coating layer results in the inclusion of these elements in a corrosion product produced in the joint. This stabilizes the corrosion product. This also retards subsequent development of corrosion. Less than 0.01% of Ca or Ca and Mg in total cannot produce this effect. On the other hand, the effect is saturated at more than 10%. Furthermore, an increase in these contents results in an increase in cost and difficulty in the control of a bath because of the oxidation of the bath or an increase in the viscosity of the bath. Thus, the Ca content or the Ca and Mg content of the coating layer is 0.01% or more and 10% or less.

When the Ca content or the Ca and Mg content is more than 2.00%, a hard intermetallic compound that contains Ca or Mg described below is formed in the Zn phase. This increases the hardness of the coating layer and allows the manufacture of a coated steel sheet having high scratch resistance in which the surface of the coating layer is resistant to scratch. Thus, the Ca content or the Ca and Mg content is preferably Ca: more than 2.00% and 10% or less or Ca+Mg: more than 2.00% and 10% or less. More preferably, Ca is 3.0% or more, and Ca+Mg is 4.0% or more.

The ratio Ca/Zn of the Ca content to the Zn content in the coating layer: 0.50 or less.

When Ca/Zn is 0.50 or less, a hard intermetallic compound that contains Ca or Mg formed in the Zn phase does not become excessively large, and the coating layer does not have locally high hardness in the vicinity of the hard intermetallic compound. Thus, the hard intermetallic compound does not become the starting point of cracking in the coating during advanced processing, and excellent scratch resistance can be achieved. Thus, Ca/Zn is preferably 0.50 or less.

The coating layer includes an upper layer and an alloy phase at an interface between the coating layer and the base steel sheet. The upper layer preferably contains Ca or Ca and Mg. When the coating layer includes the alloy phase at an interface between the coating layer and the base steel sheet and the upper layer disposed on the alloy phase and when Ca or Ca and Mg in the coating layer is mainly present in the upper layer, these elements can fully produce an effect of stabilizing a corrosion product. Ca and Mg are preferably present in the upper layer rather than the alloy phase at the interface because Ca and Mg in the upper layer can stabilize a corrosion product in an early stage of corrosion and retard subsequent development of corrosion.

The alloy phase and the upper layer in the present invention can be easily identified by the observation of a polished cross section of the coating layer with a scanning electron microscope. There are several methods for polishing or etching a cross section. Any method that is used in the observation of a cross section of a coating layer may be used.

The presence of Ca or Ca and Mg in the upper layer can be identified by the penetration analysis of the coating layer, for example, with a glow discharge optical emission spectrometer. Ca or Ca and Mg mainly present in the upper layer can be identified by examining the distribution of Ca or Ca and Mg in the coating film thickness direction, for example, by the penetration analysis of the coating layer with the glow discharge optical emission spectrometer. Use of the glow discharge optical emission spectrometer is only an example. Any method for determining the presence and distribution of Ca or Ca and Mg in the coating layer may be used.

The presence of Ca or Ca and Mg in the upper layer can be determined by the detection of 90% or more of all the detected peaks of Ca or Ca and Mg in the coating upper layer rather than the alloy phase at the interface, for example, by the penetration analysis of the coating layer with a glow discharge optical emission spectrometer. This determination method may be any method for detecting the distribution of elements in the depth direction in the coating layer and is not particularly limited.

In order to fully achieve the effect of stabilizing a corrosion product, when the coating layer is divided into equal parts in the thickness direction on the surface layer side and the base steel sheet side, Ca or Ca and Mg in the coating layer are preferably present in greater amount on the surface layer side than the base steel sheet side. Ca and Mg present in greater amount on the surface layer side can result in the presence of Ca and Mg in a corrosion product in an early stage of corrosion, thus further stabilizing the corrosion product.

Ca or Ca and Mg present in greater amount on the surface layer side can be identified by the detection of more than 50% of all the detected peaks of Ca or Ca and Mg on the surface layer side when the coating layer is divided into equal parts in the thickness direction on the surface layer side and the base steel sheet side, for example, by the penetration analysis of the coating layer with a glow discharge optical emission spectrometer. This determination method may be any method for detecting the distribution of elements in the depth direction in the coating layer and is not particularly limited.

Ca or Ca and Mg in the coating layer preferably form an intermetallic compound with one or two or more selected from Zn, Al, and Si. Since an Al phase is solidified earlier than a Zn phase in the formation of the coating layer, the intermetallic compound is incorporated into the Zn phase. Thus, Ca or Mg in the intermetallic compound always coexists with Zn. In a corrosive environment, this ensures the incorporation of Ca or Mg in a corrosion product formed of Zn, which is corroded earlier than Al, thus further effectively stabilizing the corrosion product in an early stage of corrosion. Examples of the intermetallic compound include one or two or more of $Al_4Ca$, $Al_2Ca$, $Al_2CaSi_2$, $Al_2CaSi_{1.5}$, $Ca_3Zn$, $CaZn_3$, $CaSi_2$, $CaZnSi$, $Al_2Mg_2$, $MgZn_2$, and $Mg_2Si$. These are suitable in terms of the stabilization of the corrosion product. In particular, the intermetallic compound more preferably contains Si because surplus Si in the coating layer forms non-solid-solution Si in the coating upper layer, which can prevent deterioration in bending workability. In particular, $Al_2CaSi_2$ and/or $Al_2CaSi_{1.5}$, which is an intermetallic compound easiest to form at Al: 25% to 95% by mass, Ca: 0.01% to 10% by mass, and Si: approximately 3% by mass of Al, is most preferred. This is because surplus Si in the coating layer forms nonsolid-solution Si in the upper layer, which can prevent deterioration in bending workability, as described above.

A method for determining whether Ca or Ca and Mg form an intermetallic compound with one or two or more selected from Zn, Al, and Si may be a method for detecting the intermetallic compound by the wide-angle X-ray diffraction analysis of a surface of the coated steel sheet or a method for detecting the intermetallic compound by the electron diffraction analysis of a cross section of the coating layer in a transmission electron microscope. Any other method that can detect the intermetallic compound may be used.

Next, a method for manufacturing a hot-dip Al—Zn coated steel sheet according to the present invention will be described below. Steel is hot-rolled and then cold-rolled to form a steel sheet. The steel sheet is then subjected to annealing and hot-dip Al—Zn coating treatment in a heating step with continuous hot-dip coating equipment. In an embodiment of the present invention, a temperature region having an annealing furnace internal temperature of 650° C. or more and A° C. or less (A: 700≤A≤900) in the heating step is preferably controlled to have a dew point of −40° C. or less in the atmosphere. In the coating bath, the Al content is in the range of 25% to 95% by mass, and the Ca content or the Ca and Mg content is in the range of 0.01% to 10% by mass.

Hot Rolling

General conditions may be used.

Pickling

The hot rolling is preferably followed by pickling treatment. Mill scale formed on the surface is removed in a pickling process before cold rolling. The pickling conditions are not particularly limited.

Cold Rolling

The rolling reduction is preferably 40% or more and 80% or less. A rolling reduction of less than 40% results in a decrease in recrystallization temperature and tends to cause deterioration in mechanical characteristics. On the other hand, a rolling reduction of more than 80% results in an increased rolling cost and also increased surface enrichment during annealing and may therefore cause deterioration in coatability.

Heating Step

The cold-rolled steel sheet is annealed in the heating step before hot-dip Al—Zn coating treatment.

In an annealing furnace in the heating step, a heating process for heating a steel sheet to a predetermined temperature in a heating zone is followed by a soaking process for maintaining the steel sheet in a soaking zone at a predetermined temperature for a predetermined time. As described above, in the heating step, annealing is preferably performed while the temperature region having an annealing furnace internal temperature of 650° C. or more and A° C. or less (A: 700≤A≤900) is controlled to have a dew point of −40° C. or less in the atmosphere. The annealing furnace residence time in a temperature region having a steel sheet temperature of 600° C. or more in the heating step is preferably 200 seconds or less.

Hot-Dip Coating Treatment

A hot-dip Al—Zn coated steel sheet according to the present invention may be manufactured with continuous hot-dip coating equipment. In the coating bath, the Al content is in the range of 25% to 95% by mass, and the Ca content or the Ca and Mg content is in the range of 0.01% to 10% by mass. The mass ratio Ca/Zn of the Ca content to the Zn content of the coating bath is preferably 0.50 or less. The Ca content or the Ca and Mg content is preferably more than 2% by mass and 10% by mass or less. This is also one of the most important requirements in the present invention. The coating bath having such a composition can be used to manufacture the hot-dip Al—Zn coated steel sheet. In order to reduce the excessive growth of an alloy phase, Si in the coating bath generally corresponds to approximately 3% by mass of Al, suitably 1.5% to 10% by mass of Al. In addition to Al, Zn, Ca, Mg, and Si described above, the coating bath for a coated steel sheet according to the present invention may contain another element, such as Sr, V, Mn, Ni, Co, Cr, Ti, Sb, Ca, Mo, or B, without compromising the advantages of the present invention.

A method for manufacturing a hot-dip Al—Zn coated steel sheet that includes a coating layer, which includes an alloy phase at an interface between the coating layer and the base steel sheet and an upper layer disposed on the alloy phase, and in which Ca or Ca and Mg in the coating layer is mainly present in the upper layer may be any method provided that Ca or Ca and Mg can be mainly present in the upper layer. For example, the cooling rate after coating may be increased to reduce the formation of the alloy phase, thereby decreasing residual Ca or Ca and Mg in the alloy phase. In this case, the cooling rate after coating is preferably 10° C./s or more.

A method for manufacturing a hot-dip Al—Zn coated steel sheet in which Ca or Ca and Mg in the coating layer is present in greater amount on the surface layer side than the base steel sheet side when the coating layer is divided into equal parts in the thickness direction on the surface layer side and the base steel sheet side may be any method provided that Ca and Mg can be present in greater amount on the surface layer side than the base steel sheet side when the coating layer is divided into equal parts in the thickness direction on the surface layer side and the base steel sheet side. In an exemplary method, a solidification reaction of the coating layer proceeds from the base steel sheet side to the surface layer side to eject Ca or Ca and Mg toward the surface layer side with the progress of solidification. This can be achieved in a cooling step after coating in common continuous hot-dip coating operation.

The temperature of a steel sheet dipped in the coating bath (hereinafter referred to as dipped sheet temperature) is preferably controlled within ±20° C. of the coating bath temperature so as to prevent the change of the bath temperature in the continuous hot-dip coating operation.

Thus, a hot-dip Al—Zn coated steel sheet according to the present invention can be manufactured. A hot-dip Al—Zn coated steel sheet according to the present invention preferably includes a hot-dip Al—Zn coating layer, wherein the amount of coating adhered to the surface of the steel sheet is preferably 20 to 120 g/m² per surface. It is difficult to ensure corrosion resistance at less than 20 g/m². On the other hand, more than 120 g/m² causes deterioration in the peel resistance of coating.

The surface of the base steel sheet directly under the coating layer has the following structural characteristics.

A surface of the steel sheet within 100 μm from a surface of the base steel sheet directly under the Al—Zn coating layer is controlled such that an internal oxide of at least one selected from Fe, Si, Mn, Al, P, B, Nb, Ti, Cr, Mo, Cu, and Ni is less than 0.060 g/m² per surface.

The hot-dip Al—Zn coated steel sheet may include a chemical conversion film and/or a coating film containing organic resin on the surface thereof to form a surface-treated steel sheet. The chemical conversion film may be formed by chromate treatment or chromium-free chemical conversion treatment in which a chromate treatment liquid or a chromium-free chemical conversion liquid is applied and dried at a steel sheet temperature in the range of 80° C. to 300° C. without water washing. The chemical conversion film may be a monolayer or multilayer. The multilayer may be formed by performing a plurality of chemical conversion treatments.

Furthermore, a monolayer or multilayer coating film that contains organic resin may be formed on the surface of the coating layer or the chemical conversion film. Examples of the coating film include polyester resin coating films, epoxy resin coating films, acrylic resin coating films, urethane resin coating films, and fluoropolymer coating films. Some of these resins modified with another resin, for example, epoxy-modified polyester resin coating films may be used. If necessary, a curing agent, a curing catalyst, a pigment, and/or an additive agent may be added to these resins.

A coating method for forming the coating film may be, but is not limited to, roll coater coating, curtain flow coating, or spray coating. A paint that contains organic resin may be applied and heat-dried, for example, by hot-air drying, infrared heating, or induction heating, to form the coating film.

The method for manufacturing a surface-treated steel sheet described above is a nonlimiting example.

EXAMPLES

The present invention will be further described in the following examples.

A hot-rolled steel sheet having a steel composition shown in Table 1 was pickled and, after removing mill scale, was cold-rolled at a rolling reduction of 50% to form a cold-rolled steel sheet having a thickness of 1.0 mm.

The cold-rolled steel sheet was then passed through continuous hot-dip coating equipment to manufacture a hot-dip Al—Zn coated steel sheet. Table 2 shows the composition of a coating bath (the Al, Zn, Si, Ca, or Mg content and the Ca and Mg content of the coating bath composition are the same as the coating layer). Table 3 shows the manufacturing conditions for the continuous hot-dip coating equipment. The line speed was 100 m/min. The amount of coating was controlled by gas wiping. The dipped sheet temperature in the coating bath was controlled between the coating bath temperature and the coating bath temperature +5° C. In a method for manufacturing a hot-dip Al—Zn coated steel sheet in which Ca or Ca and Mg in the coating layer are mainly present in the upper layer, the cooling rate after coating was 15° C./s.

The hot-dip Al—Zn coated steel sheet was examined with respect to coating appearance (the presence of an uncoated portion), scratch resistance, joint corrosion resistance, and mechanical characteristics (processability). The amount of oxide (the amount of internal oxidation) within 100 μm from the surface of the surface layer of the base steel sheet directly under the coating layer and the percentage of Ca and Mg in the upper layer of the coating layer were measured. The measurement method and the evaluation criteria are described below.

Coating Appearance

The coating appearance was visually inspected. The absence of an uncoated portion (a portion not covered with coating) was considered to be satisfactory appearance (symbol O), and the presence of an uncoated portion (a portion not covered with coating) was considered to be defective appearance (symbol X).

When the coating appearance was considered to be defective appearance (symbol X), scratch resistance, joint corrosion resistance, and mechanical characteristics were not evaluated.

Scratch Resistance

Scratch resistance was evaluated with a micro-Vickers hardness tester as described below. A steel sheet to be evaluated was cut, was embedded in a resin mold such that the shear plane was exposed, and was polished. Hardness was then measured 20 times at each of certain positions on the upper layer of the coating layer under a load of 0.049 N (5 gf) perpendicular to the shear plane. When the average hardness of the 20 measurements was 200 (Hv) or more, the scratch resistance was considered to be "⊚" (double circle). When the average hardness of 20 measurements was 150 (Hv) or more and less than 200 (Hv), the scratch resistance was considered to be "○". When the average hardness of 20 measurements was 100 (Hv) or more and less than 150 (Hv), the scratch resistance was considered to be "Δ". When the average hardness of 20 measurements was less than 100 (Hv), the scratch resistance was considered to be "X".

Joint Corrosion Resistance

Figure 2:
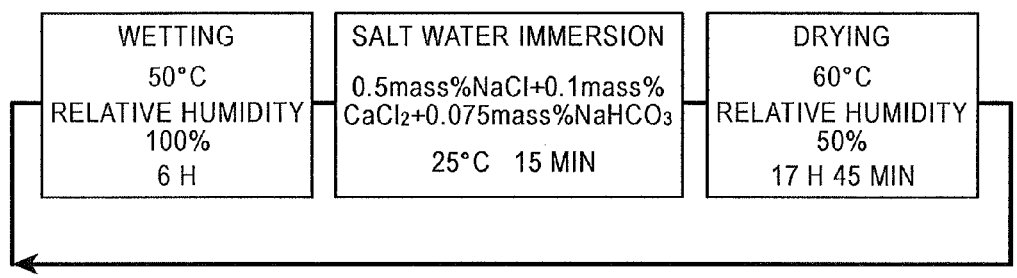
FIG. 2 is a block diagram of a corrosion resistance test cycle. (Example 1)

Regarding joint corrosion resistance, as illustrated in FIG. 1, a coated surface of a galvannealed steel sheet (large sheet) having a coating amount of 45 g/m$^2$ per surface and a surface of the hot-dip Al—Zn coated steel sheet (small sheet: a steel sheet to be tested) on which the coating layer was formed were joined by spot welding to form a laminated sheet. The laminated sheet was then subjected to chemical conversion treatment (zinc phosphate 2.0 to 3.0 g/m$^2$) and electrodeposition coating (film thickness 20±1 μm) and was subjected to a corrosion resistance test cycle illustrated in FIG. 2. The corrosion resistance test was started with wetting. After 150 cycles, the joint corrosion resistance was evaluated as described below.

A joint of the test specimen subjected to the corrosion resistance test was disjointed to remove the coating film and rust. The corrosion depth of the base steel sheet was measured with a micrometer. A corroded portion of the test specimen was divided into 10 sections each having a size of 20 mm×15 mm. The maximum corrosion depth of each section was determined as a difference between the layer thickness of an uncorroded portion and the layer thickness of the corroded portion. The extreme value statistics analysis was performed by applying Gumbel distribution to the maximum corrosion depth data of each section to determine the most frequent value of the maximum corrosion depth.

When the most frequent value of the maximum corrosion depth after the corrosion resistance test was more than 0.5 mm, mechanical characteristics were not evaluated.

Mechanical Characteristics (Processability)

Regarding mechanical characteristics, a JIS No. 5 test piece for tensile test was taken from a sample in a direction perpendicular to the rolling direction. A tensile test was performed in accordance with JIS Z 2241 1998 at a crosshead speed of 10 mm/min to determine tensile strength (TS (MPa)) and elongation (El (%)). A test piece having TS×El≥18000 had particularly excellent mechanical characteristics and was represented by "○" in processability in Table 3. A test piece having TS×El<18000 was represented by "X" in processability.

The amount of internal oxidation within 100 μm from the surface directly under the coating layer was measured by an "impulse furnace fusion-infrared absorption method". As described above, the oxygen content $O_I$ of the entire steel sheet and the oxygen content $O_H$ of the material were used to calculate a difference between $O_I$ and $O_H$ (=$O_I$–$O_H$). The difference was converted into a value per surface unit area (that is, 1 m$^2$) (g/m$^2$), which was assumed to be the amount of internal oxidation.

Regarding the percentage of Ca and Mg in the upper layer of the coating layer, 4 mmφ on a surface of the coating layer was subjected to the penetration analysis in the thickness direction of the coating layer with a glow discharge optical emission spectrometer to examine the distribution of Ca or Ca and Mg in the thickness direction of the coating layer. More specifically, the number of seconds (sputtering time) elapsed before the waveform of the detected intensity of Ca and Mg converged to the detected value of the base steel sheet was considered to be the coating layer thickness. The number of seconds (sputtering time) elapsed before the detected intensity waveform of Ca and Mg had an inflection point was considered to be the upper layer thickness. When the coating layer contained Ca, the percentage of Ca in the upper layer based on Ca and Mg in the entire coating layer (the ratio of integrated values of detected intensities) was determined. When the coating layer contained Ca and Mg, the percentage of Ca and Mg in the upper layer based on Ca and Mg in the entire coating layer (the ratio of integrated values of detected intensities) was determined.

Table 3 shows various characteristics of the Al—Zn coated steel sheet thus manufactured and the manufacturing conditions.

TABLE 1

| Steel | C | Si | Mn | Al | P | S | Cr | Mo | B | Nb | Cu | Ni | Ti (mass %) |
|---|---|---|---|---|---|---|---|---|---|---|---|---|---|
| A | 0.02 | 0.005 | 2.0 | 0.03 | 0.01 | 0.004 | — | — | — | — | — | — | — |
| B | 0.05 | 0.03 | 1.2 | 0.03 | 0.01 | 0.004 | — | — | — | — | — | — | — |
| C | 0.15 | 0.1 | 2.1 | 0.03 | 0.01 | 0.004 | — | — | — | — | — | — | — |
| D | 0.05 | 0.25 | 2.0 | 0.03 | 0.01 | 0.004 | — | — | — | — | — | — | — |
| E | 0.02 | 0.4 | 2.0 | 0.03 | 0.01 | 0.004 | — | — | — | — | — | — | — |
| F | 0.12 | 0.8 | 1.9 | 0.03 | 0.01 | 0.004 | — | — | — | — | — | — | — |
| G | 0.17 | 1.2 | 2.1 | 0.03 | 0.01 | 0.004 | — | — | — | — | — | — | — |
| H | 0.10 | 1.6 | 2.0 | 0.03 | 0.01 | 0.004 | — | — | — | — | — | — | — |
| I | 0.05 | 2.0 | 2.1 | 0.03 | 0.01 | 0.004 | — | — | — | — | — | — | — |
| J | 0.12 | 0.8 | 2.9 | 0.03 | 0.01 | 0.004 | — | — | — | — | — | — | — |
| K | 0.12 | 0.8 | 2.0 | 0.9 | 0.01 | 0.004 | — | — | — | — | — | — | — |
| L | 0.12 | 0.8 | 2.1 | 0.03 | 0.05 | 0.004 | — | — | — | — | — | — | — |
| M | 0.12 | 0.8 | 1.9 | 0.03 | 0.01 | 0.009 | — | — | — | — | — | — | — |
| N | 0.12 | 0.8 | 1.9 | 0.02 | 0.01 | 0.004 | 0.8 | — | — | — | — | — | — |
| O | 0.12 | 0.8 | 1.9 | 0.03 | 0.01 | 0.004 | — | 0.1 | — | — | — | — | — |
| P | 0.12 | 0.8 | 2.2 | 0.03 | 0.01 | 0.004 | — | — | 0.003 | — | — | — | — |
| Q | 0.12 | 0.8 | 2.0 | 0.05 | 0.01 | 0.004 | — | — | 0.001 | 0.03 | — | — | — |
| R | 0.12 | 0.8 | 1.9 | 0.03 | 0.01 | 0.004 | — | 0.1 | — | — | 0.1 | 0.2 | — |
| S | 0.12 | 0.8 | 1.9 | 0.04 | 0.01 | 0.004 | — | — | 0.001 | — | — | — | 0.02 |
| T | 0.12 | 0.8 | 1.9 | 0.03 | 0.01 | 0.004 | — | — | — | — | — | — | 0.05 |

TABLE 2

| Coating bath | Coating bath composition (mass %) | | | | | | Coating bath Ca/Zn | Bath temperature (° C.) | Note |
|---|---|---|---|---|---|---|---|---|---|
| | Al | Zn | Si | Ca | Mg | Ca + Mg | | | |
| a | 90 | 5 | 2.9 | 1.27 | 1.05 | 2.32 | 0.27 | 670 | Example |
| b | 90 | 5 | 2.9 | 2.13 | 0.00 | 2.13 | 0.43 | 670 | Example |
| c | 82 | 11 | 2.5 | 2.23 | 2.09 | 4.32 | 0.20 | 650 | Example |
| d | 82 | 14 | 2.5 | 1.89 | 0.00 | 1.89 | 0.14 | 650 | Example |
| e | 71 | 22 | 2.2 | 2.54 | 2.27 | 4.81 | 0.12 | 620 | Example |
| f | 71 | 24 | 2.2 | 2.92 | 0.00 | 2.92 | 0.12 | 620 | Example |
| g | 55 | 37 | 1.6 | 3.26 | 3.03 | 6.29 | 0.09 | 570 | Example |
| h | 55 | 40 | 1.6 | 3.56 | 0.00 | 3.56 | 0.09 | 570 | Example |
| i | 48 | 43 | 1.5 | 4.25 | 3.61 | 7.86 | 0.10 | 560 | Example |
| j | 48 | 45 | 1.5 | 5.69 | 0.00 | 5.69 | 0.13 | 560 | Example |
| k | 42 | 49 | 1.3 | 4.16 | 3.48 | 7.64 | 0.08 | 540 | Example |
| l | 42 | 52 | 1.3 | 4.56 | 0.00 | 4.56 | 0.09 | 540 | Example |
| m | 27 | 64 | 0.7 | 4.36 | 3.68 | 8.04 | 0.07 | 520 | Example |
| n | 27 | 66 | 0.7 | 5.85 | 0.00 | 5.85 | 0.09 | 520 | Example |
| o | 55 | 43 | 1.6 | <u>0.00</u> | 0.00 | <u>0.00</u> | 0.00 | 600 | <u>Comparative example</u> |

Underline indicates outside the scope of the present invention

TABLE 3

| No. | Steel Symbol | Si (mass %) | Mn (mass %) | Cold-rolling reduction (%) | Residence time at steel sheet temperature of 600° C. or more (s) | Dew point at furnace internal temperature 650 to A ° C. (° C.) | Temperature A (° C.) | Amount of internal oxidation (g/m²) | Coating bath composition (symbol) | Amount of coating (g/m²) | Ca/Mg ratio in coating upper layer (%) |
|---|---|---|---|---|---|---|---|---|---|---|---|
| 1 | A | 0.005 | 2.1 | 50 | 150 | −45 | 800 | 0.021 | d | 40 | 93 |
| 2 | B | 0.03 | 1.2 | 50 | 150 | −45 | 800 | 0.016 | d | 40 | 94 |
| 3 | C | 0.1 | 2.1 | 50 | 150 | −45 | 800 | 0.029 | d | 40 | 92 |
| 4 | D | 0.25 | 2.0 | 50 | 150 | −45 | 800 | 0.035 | d | 40 | 94 |
| 5 | E | 0.4 | 2.0 | 50 | 150 | −45 | 800 | 0.039 | d | 40 | 95 |
| 6 | F | 0.8 | 1.9 | 50 | 150 | <u>−25</u> | 800 | <u>0.125</u> | d | 40 | 94 |

TABLE 3-continued

| No. | | | | | | | | | | | |
|---|---|---|---|---|---|---|---|---|---|---|---|
| 7 | F | 0.8 | 1.9 | 50 | 150 | −35 | 800 | 0.071 | d | 40 | 94 |
| 8 | F | 0.8 | 1.9 | 50 | 150 | −38 | 800 | 0.063 | d | 40 | 93 |
| 9 | F | 0.8 | 1.9 | 50 | 150 | −40 | 800 | 0.055 | d | 40 | 94 |
| 10 | F | 0.8 | 1.9 | 50 | 150 | −45 | 800 | 0.041 | d | 40 | 94 |
| 11 | F | 0.8 | 1.9 | 50 | 150 | −50 | 800 | 0.028 | d | 40 | 93 |
| 12 | F | 0.8 | 1.9 | 50 | 150 | −60 | 800 | 0.011 | d | 40 | 93 |
| 13 | F | 0.8 | 1.9 | 50 | 150 | −45 | 700 | 0.052 | d | 40 | 94 |
| 14 | F | 0.8 | 1.9 | 50 | 60 | −45 | 900 | 0.028 | d | 40 | 92 |
| 15 | F | 0.8 | 1.9 | 50 | 150 | −45 | 800 | 0.041 | d | 20 | 93 |
| 16 | F | 0.8 | 1.9 | 50 | 150 | −45 | 800 | 0.040 | d | 80 | 94 |
| 17 | F | 0.8 | 1.9 | 50 | 150 | −45 | 800 | 0.043 | d | 120 | 92 |
| 18 | F | 0.8 | 1.9 | 50 | 120 | −45 | 800 | 0.040 | a | 40 | 96 |
| 19 | F | 0.8 | 1.9 | 50 | 100 | −45 | 800 | 0.041 | b | 40 | 98 |
| 20 | F | 0.8 | 1.9 | 50 | 150 | −45 | 800 | 0.041 | c | 40 | 98 |
| 21 | F | 0.8 | 1.9 | 50 | 150 | −45 | 800 | 0.039 | e | 40 | 97 |
| 22 | F | 0.8 | 1.9 | 50 | 150 | −45 | 800 | 0.040 | f | 40 | 98 |
| 23 | F | 0.8 | 1.9 | 50 | 80 | −45 | 800 | 0.039 | g | 40 | 97 |
| 24 | F | 0.8 | 1.9 | 50 | 150 | −45 | 800 | 0.042 | h | 40 | 96 |
| 25 | F | 0.8 | 1.9 | 50 | 150 | −45 | 800 | 0.043 | i | 40 | 94 |
| 26 | F | 0.8 | 1.9 | 50 | 150 | −45 | 800 | 0.041 | j | 40 | 95 |
| 27 | F | 0.8 | 1.9 | 50 | 150 | −45 | 800 | 0.041 | k | 40 | 95 |
| 28 | F | 0.8 | 1.9 | 50 | 150 | −45 | 800 | 0.042 | l | 40 | 94 |
| 29 | F | 0.8 | 1.9 | 50 | 30 | −45 | 800 | 0.038 | m | 40 | 95 |
| 30 | F | 0.8 | 1.9 | 50 | 150 | −45 | 800 | 0.039 | n | 40 | 96 |
| 31 | F | 0.8 | 1.9 | 50 | 150 | −45 | 800 | 0.040 | o | 40 | 0 |
| 32 | G | 1.2 | 2.1 | 50 | 150 | −45 | 800 | 0.048 | f | 40 | 98 |
| 33 | H | 1.6 | 2.0 | 50 | 150 | −45 | 800 | 0.051 | f | 40 | 97 |
| 34 | I | 2.0 | 2.1 | 50 | 180 | −45 | 800 | 0.056 | f | 40 | 98 |
| 35 | J | 0.8 | 2.9 | 50 | 150 | −45 | 800 | 0.047 | f | 40 | 99 |
| 36 | K | 0.8 | 2.0 | 50 | 160 | −45 | 800 | 0.053 | f | 40 | 98 |
| 37 | L | 0.8 | 2.1 | 50 | 150 | −45 | 800 | 0.038 | f | 40 | 99 |
| 38 | M | 0.8 | 1.9 | 50 | 150 | −45 | 800 | 0.045 | f | 40 | 97 |
| 39 | N | 0.8 | 1.9 | 50 | 150 | −45 | 800 | 0.049 | f | 40 | 98 |
| 40 | O | 0.8 | 1.9 | 50 | 150 | −45 | 800 | 0.045 | f | 40 | 97 |
| 41 | P | 0.8 | 2.2 | 50 | 150 | −45 | 800 | 0.046 | f | 40 | 98 |
| 42 | Q | 0.8 | 2.0 | 50 | 150 | −45 | 800 | 0.043 | f | 40 | 98 |
| 43 | R | 0.8 | 1.9 | 50 | 150 | −45 | 800 | 0.044 | f | 40 | 97 |
| 44 | S | 0.8 | 1.9 | 50 | 150 | −45 | 800 | 0.041 | f | 40 | 99 |
| 45 | T | 0.8 | 1.9 | 50 | 150 | −45 | 800 | 0.039 | f | 40 | 98 |
| 46 | F | 0.8 | 1.9 | 50 | 200 | −45 | 800 | 0.056 | d | 40 | 94 |
| 47 | F | 0.8 | 1.9 | 50 | 210 | −45 | 800 | 0.062 | d | 40 | 94 |
| 48 | F | 0.8 | 1.9 | 50 | 30 | −45 | 680 | 0.026 | d | 40 | 94 |

| No. | Coating appearance | Scratch resistance | Joint corrosion resistance Most frequent value of maximum corrosion depth after joint corrosion resistance test (mm) | Mechanical characteristics | | | Processability | Note |
|---|---|---|---|---|---|---|---|---|
| | | | | TS (MPa) | El (%) | TS × EL | | |
| 1 | ○ | Δ | 0.20 | 664 | 35.3 | 23439 | ○ | Example |
| 2 | ○ | Δ | 0.21 | 657 | 36.2 | 23783 | ○ | Example |
| 3 | ○ | Δ | 0.18 | 790 | 29.3 | 23147 | ○ | Example |
| 4 | ○ | Δ | 0.22 | 662 | 43.4 | 28731 | ○ | Example |
| 5 | ○ | Δ | 0.18 | 1001 | 20.8 | 20821 | ○ | Example |
| 6 | X | — | — | — | — | — | — | Comparative example |
| 7 | X | — | — | — | — | — | — | Comparative example |
| 8 | X | — | — | — | — | — | — | Comparative example |
| 9 | ○ | Δ | 0.19 | 1022 | 19.1 | 19520 | ○ | Example |
| 10 | ○ | Δ | 0.20 | 1032 | 18.7 | 19298 | ○ | Example |
| 11 | ○ | Δ | 0.16 | 1026 | 19.8 | 20315 | ○ | Example |
| 12 | ○ | Δ | 0.21 | 1026 | 19.8 | 20315 | ○ | Example |
| 13 | ○ | Δ | 0.18 | 1031 | 19.8 | 20414 | ○ | Example |
| 14 | ○ | Δ | 0.18 | 1041 | 18.4 | 19154 | ○ | Example |
| 15 | ○ | Δ | 0.20 | 1021 | 18.1 | 18480 | ○ | Example |
| 16 | ○ | Δ | 0.19 | 1036 | 18.3 | 18959 | ○ | Example |
| 17 | ○ | Δ | 0.20 | 1024 | 20.3 | 20787 | ○ | Example |
| 18 | ○ | ○ | 0.33 | 1022 | 19.4 | 19827 | ○ | Example |
| 19 | ○ | ○ | 0.39 | 1066 | 19.5 | 20787 | ○ | Example |
| 20 | ○ | ○ | 0.07 | 1028 | 18.9 | 19429 | ○ | Example |
| 21 | ○ | ○ | 0.05 | 1025 | 18.9 | 19373 | ○ | Example |
| 22 | ○ | ○ | 0.21 | 1038 | 18.6 | 19307 | ○ | Example |
| 23 | ○ | ◎ | 0.06 | 1021 | 19.1 | 19501 | ○ | Example |
| 24 | ○ | ○ | 0.28 | 1019 | 18.4 | 18750 | ○ | Example |
| 25 | ○ | ◎ | 0.17 | 1034 | 19.4 | 20060 | ○ | Example |
| 26 | ○ | ◎ | 0.32 | 1029 | 18.2 | 18728 | ○ | Example |
| 27 | ○ | ◎ | 0.36 | 1021 | 18.4 | 18786 | ○ | Example |
| 28 | ○ | ◎ | 0.38 | 1033 | 19.4 | 20040 | ○ | Example |
| 29 | ○ | ◎ | 0.35 | 1028 | 18.9 | 19429 | ○ | Example |

TABLE 3-continued

| | | | | | | | | |
|---|---|---|---|---|---|---|---|---|
| 30 | ○ | ⊚ | 0.44 | 1041 | 19.2 | 19987 | ○ | Example |
| 31 | ○ | X | 0.65 | — | — | — | — | Comparative example |
| 32 | ○ | ○ | 0.24 | 1228 | 17.4 | 21367 | ○ | Example |
| 33 | ○ | ○ | 0.22 | 1016 | 19.3 | 19609 | ○ | Example |
| 34 | ○ | ○ | 0.23 | 1002 | 20.0 | 20040 | ○ | Example |
| 35 | ○ | ○ | 0.18 | 1124 | 19.5 | 21918 | ○ | Example |
| 36 | ○ | ○ | 0.26 | 1089 | 18.9 | 20582 | ○ | Example |
| 37 | ○ | ○ | 0.26 | 1176 | 17.5 | 20580 | ○ | Example |
| 38 | ○ | ○ | 0.23 | 1011 | 19.4 | 19613 | ○ | Example |
| 39 | ○ | ○ | 0.24 | 1045 | 19.9 | 20796 | ○ | Example |
| 40 | ○ | ○ | 0.25 | 1026 | 20.9 | 21443 | ○ | Example |
| 41 | ○ | ○ | 0.22 | 1031 | 18.1 | 18661 | ○ | Example |
| 42 | ○ | ○ | 0.21 | 1075 | 17.5 | 18813 | ○ | Example |
| 43 | ○ | ○ | 0.20 | 1028 | 18.1 | 18607 | ○ | Example |
| 44 | ○ | ○ | 0.23 | 1046 | 19.9 | 20815 | ○ | Example |
| 45 | ○ | ○ | 0.24 | 1034 | 19.7 | 20370 | ○ | Example |
| 46 | ○ | Δ | 0.25 | 1028 | 19.2 | 19738 | ○ | Example |
| 47 | X | — | — | — | — | — | — | Comparative example |
| 48 | ○ | Δ | 0.24 | 1165 | 11.6 | 13514 | X | Example |

Underline indicates outside the scope of the present invention

Tables 1 to 3 shows that the Examples provided a hot-dip Al—Zn coated steel sheet having an excellent coating appearance. The tables also show that the most frequent value of the maximum corrosion depth in the 150 corrosion resistance test cycles was less than 0.5 mm, indicating excellent joint corrosion resistance. Depending on the steel composition and the annealing conditions, a hot-dip Al—Zn coated steel sheet having excellent mechanical characteristics can be manufactured. It was shown that Al—Zn coating layers that contained more than 2.00% by mass of Ca and Mg manufactured using coating baths a, b, c, e, f, g, h, I, j, k, l, m, and n according to the working examples had high scratch resistance. It was also shown that Al—Zn coating layers that contained 3.0% by mass or more of Ca and 4.0% by mass or more of Ca and Mg manufactured using coating baths g, I, j, k, l, m, and n had particularly high scratch resistance. Comparative Examples Nos. 6, 7, 8, and 47 had a large amount of internal oxidation and underwent the surface enrichment of an oxidizable element under the conditions of the heating step, resulting in the presence of an uncoated portion and poor coating appearance.

A hot-dip Al—Zn coated steel sheet according to the present invention has excellent coating appearance and corrosion resistance. In particular, a hot-dip Al—Zn coated steel sheet according to the present invention applied to high-strength steel can be utilized as a surface-treated steel sheet for decreasing the weight and increasing the strength of automobile bodies. In addition to automobiles, a hot-dip Al—Zn coated steel sheet according to the present invention can be used in a wide variety of fields, such as household electrical appliances and construction materials, as a surface-treated steel sheet in which rust prevention is imparted to the material steel sheet.

The invention claimed is:

1. A hot-dip Al—Zn coated steel sheet that includes an Al—Zn coating layer having an Al content in the range of 20% to 95% by mass on a surface of the steel sheet, wherein the Al—Zn coating layer contains 0.01% to 10% by mass of Ca, the coating layer having equal parts in a thickness direction with one part nearer an outer surface of the coating layer and one part nearer the steel sheet, wherein the Ca is present in a greater amount in the part of the coating layer nearer the outer surface of the coating layer, and wherein a steel sheet surface layer within 100 μm from a surface of the base steel sheet directly under the Al—Zn coating layer contains less than 0.060 g/m² per surface of an oxide of at least one selected from Fe, Si, Mn, Al, P, B, Nb, Ti, Cr, Mo, Cu, and Ni in total.

2. The hot-dip Al—Zn coated steel sheet according to claim 1, wherein the ratio Ca/Zn of the Ca content to the Zn content in the Al—Zn coating layer is 0.50 or less.

3. The hot-dip Al—Zn coated steel sheet according to claim 1, wherein the Al—Zn coating layer contains more than 2.00% by mass and 10% by mass or less of Ca or Ca and Mg in total.

4. A hot-dip Al—Zn coated steel sheet that includes an Al—Zn coating layer having an Al content in the range of 20% to 95% by mass on a surface of the steel sheet, wherein the Al—Zn coating layer contains 0.01% to 10% by mass of Ca and Mg in total, wherein the mass of Ca is greater than zero and the mass of Mg is greater than zero, the coating layer having equal parts in a thickness direction with one part nearer an outer surface of the coating layer and one part nearer the steel sheet, wherein the Ca and Mg are present in a greater amount in the part of the coating layer nearer the outer surface of the coating layer, and wherein a steel sheet surface layer within 100 μm from a surface of the base steel sheet directly under the Al—Zn coating layer contains less than 0.060 g/m² per surface of an oxide of at least one selected from Fe, Si, Mn, Al, P, B, Nb, Ti, Cr, Mo, Cu, and Ni in total.

* * * * *